US011340703B1

(12) United States Patent
Anand

(10) Patent No.: US 11,340,703 B1
(45) Date of Patent: May 24, 2022

(54) SMART GLASSES BASED CONFIGURATION OF PROGRAMMING CODE

(71) Applicant: Bank of America Corporation, Charlotte, NC (US)

(72) Inventor: Vasuki Anand, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/361,516

(22) Filed: Jun. 29, 2021

(51) Int. Cl.
*G06F 3/01* (2006.01)
*G06F 3/0482* (2013.01)
*G02B 27/01* (2006.01)
*G06F 1/16* (2006.01)
*G02B 27/00* (2006.01)

(52) U.S. Cl.
CPC ......... *G06F 3/013* (2013.01); *G02B 27/0093* (2013.01); *G02B 27/017* (2013.01); *G06F 1/163* (2013.01); *G06F 3/0482* (2013.01); *G02B 2027/0178* (2013.01)

(58) Field of Classification Search
CPC .............. G02B 27/017; G02B 27/0093; G02B 2027/0178; G02B 27/0176; G02B 27/0172; G02B 2027/0174; G02B 2027/018; G06F 3/013
USPC .............................................................. 345/8
See application file for complete search history.

(56) References Cited

U.S. PATENT DOCUMENTS 6,243,076 B1 * 6/2001 Hatfield .................. G06F 3/038
715/977
9,588,342 B2 * 3/2017 Grigg ...................... H04W 4/21

* cited by examiner

*Primary Examiner* — Koosha Sharifi-Tafreshi
(74) *Attorney, Agent, or Firm* — Weiss & Arons LLP

(57) ABSTRACT

Systems, methods, and apparatus for smart glasses based configuration of programming code are provided. A smart glasses device may capture a sequence of user eye positions using one or more sensors. A user interface may display one or more selectable programming functions. Each programming function may be pre-associated with a segment of programming code implementing the function. The user eye positions captured by the smart glasses may be filtered based on the degree of visual focus. A calibration engine may map each user eye position to one of the selectable programming functions displayed on the user interface. The selected programming functions may be ordered based on the sequence of user eye positions. A software application may be configured by assembling the segments of programming code associated with each programming function.

21 Claims, 7 Drawing Sheets

SMART GLASSES BASED CONFIGURATION OF PROGRAMMING CODE

FIELD OF TECHNOLOGY

Aspects of the disclosure relate to integrating smart glasses technology with no-code software development.

BACKGROUND OF THE DISCLOSURE

Smart glasses may be defined as wearable glasses that include both hardware and software components. Smart glasses may adopt the structure of a conventional pair of eyeglasses such as a frame and lenses. A microprocessor may be embedded within the glasses and may provide processing capabilities.

Generating application programming code typically requires skilled programmers with knowledge of relevant programming languages. In recent years, low-code and no-code development platforms have been designed for users without programming experience. A no-code development platform may include a user interface displaying graphical representations of different programming functions. On the backend, each of these graphical representations may be associated with corresponding programming code. A user may manipulate these graphical units to create a software application.

Conventionally, no-code development platforms are based on a computing device and the selectable programming functions are manipulated with a mouse or through inputs to a touchscreen or keyboard. It would be desirable to integrate smart glasses technology with no-code development to enable configuration of programming code through smart glasses interactions. In particular, it would be desirable to enable configuration of programming code through calibration of eye movements detected by the smart glasses.

SUMMARY OF THE DISCLOSURE

Systems, methods, and apparatus for smart glasses based configuration of programming code are provided.

A smart glasses device may include a frame supporting one or more lenses, a microprocessor embedded in the frame, a wireless communication interface embedded in the frame, a battery for powering the communication interface and the microprocessor, a sensor configured to capture a user eye position, and executable instructions stored in a non-transitory memory.

The executable instructions when run by the microprocessor may capture a sequence of user eye positions with the sensor and transmit the sequence of user eye positions to a smart glasses interface using the wireless communication interface.

A user interface may display one or more selectable programming functions. Each programming function may be pre-associated with a segment of programming code implementing the function. The user interface may be displayed on a computing device external to the smart glasses.

The smart glasses interface may receive the sequence of user eye positions. The smart glasses interface may filter the user eye positions based on a determination of visual focus. A calibration engine may map a user eye position to one of the selectable programming functions displayed on the user interface.

The calibration engine may order the programming functions based, at least in part, on the sequence of user eye positions. The calibration engine may generate a software application by assembling the segments of programming code associated with each programming function in the order of selection.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
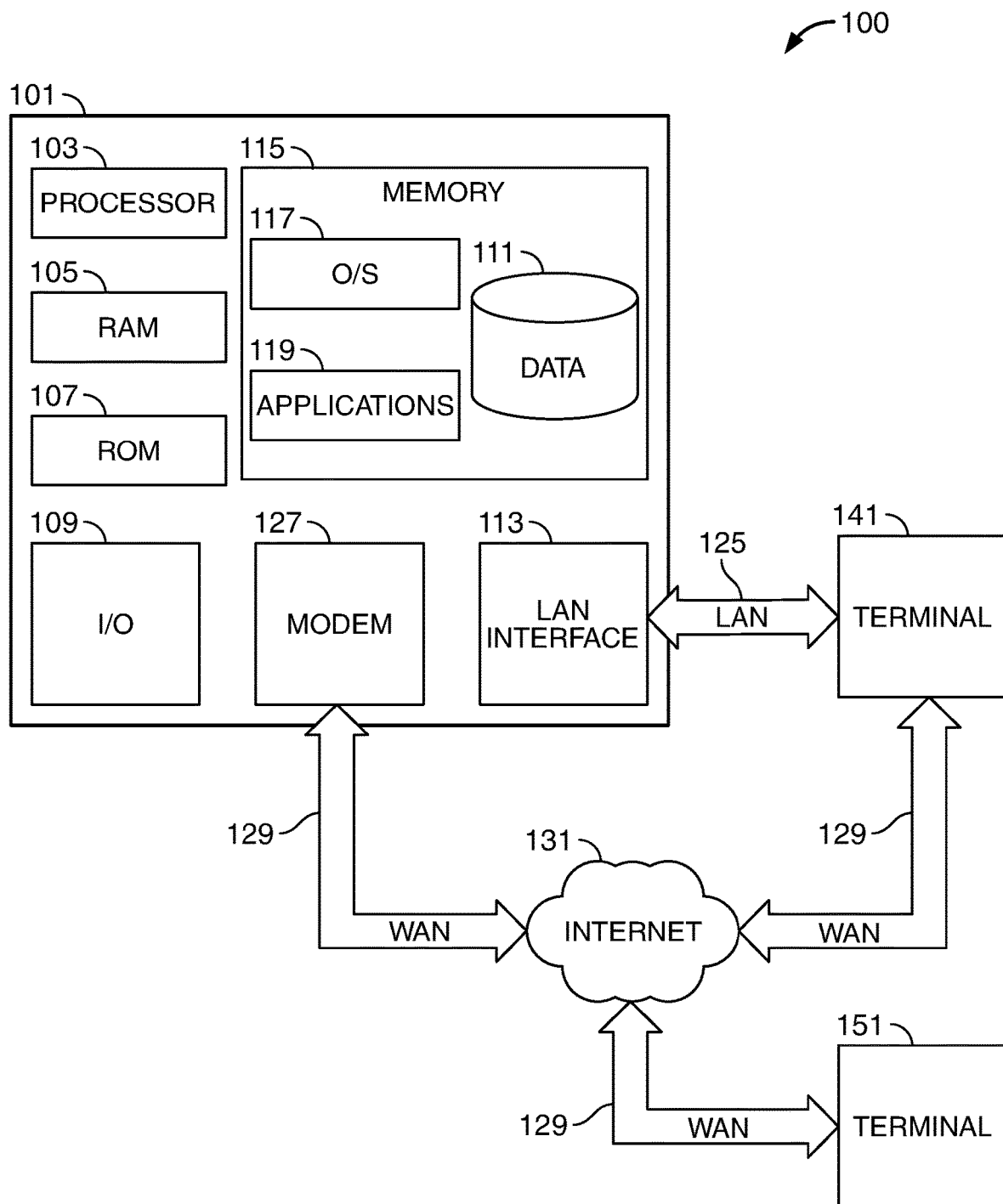
FIG. 1 shows illustrative apparatus in accordance with principles of the disclosure.

Systems, methods and apparatus for smart glasses based configuration of programming code are provided.

For the sake of illustration, the invention will be described as being performed by a "system." The system may include one or more features of apparatus and methods that are described herein and/or any other suitable device or approach.

The system may include wearable smart glasses. The smart glasses may be structured with a frame and lenses. The frame and/or lenses may include embedded or partially embedded hardware and software components.

The smart glasses may include one or more microprocessors. The smart glasses may include one or more software applications. The applications may enable the smart glasses to execute various tasks. One or more of the software applications may be executed on the processors. Software applications may be stored in a memory embedded in the smart glasses.

The smart glasses may include one or more displays. In some embodiments, a smart glasses display may add data alongside the view through the lenses using augmented reality technology. A display controller may be configured to display data as a semi-transparent overlay appearing on the lenses. Augmented reality displays may be achieved through curved mirror techniques. Alternative techniques include waveguide-based technology such as a virtual retinal display.

The smart glasses may include one or more communication transceivers. The communication transceivers may be operable to communicate with an external processor. The external processor may be located within a mobile device or any other suitable computing device.

The smart glasses may include a nano wireless network interface card ("NIC"). The nano wireless NIC may provide the smart glasses with a dedicated, full-time connection to a wireless network. The nano wireless NIC may implement the physical layer circuitry necessary for communicating with a data link layer standard, such as Wi-Fi. The nano wireless NIC may support input/output ("I/O"), interrupt, direct memory access, interfaces, data transmission, network traffic engineering and/or partitioning.

The smart glasses may include a wireless controller application. The wireless controller application may be configured to interface between the NIC and an external Wi-Fi device. The wireless controller application may be configured to transmit data collected by the smart glasses over the wireless network.

The smart glasses may include an active near field communication ("NFC") reader configured to establish contactless communication with another device located within a predetermined proximity to the smart glasses device. In some embodiments, one smart glasses device may communicate with another smart glasses device using NFC technology.

The smart glasses may include an embedded subscriber identification module ("E-SIM") card. The E-SIM may enable the smart glasses to communicate and share data with another pair of smart glasses. The smart glasses may include one or more wired and/or wireless communication applications such as Bluetooth™. Smart glasses may utilize cellular technology or Wi-Fi to be operable as wearable computers running self-contained mobile applications.

The smart glasses may include a battery. The battery may be configured to power hardware components such as the microprocessor and the display. The battery may be rechargeable. The battery may be recharged via any suitable method. Illustrative charging methods include solar charging, wireless inductive charging, and connection via a charging port.

The smart glasses may include one or more cameras for capturing images and/or videos, one or more audio input devices, and one or more audio output devices.

Smart glasses inputs from a user may be hands-on. Smart glasses inputs from a user may be hands-free. In some embodiments, smart glasses inputs may involve a combination of hands-on and hands-free protocols.

In some embodiments, the smart glasses inputs may be hands-on. The smart glasses may require the use of touch buttons on the frame. In some embodiments, the user input may also be entered via a nano touch screen incorporated into the frame or lenses of the smart glasses. The nano touch screen may be a nano light emitting diode ("LED") touch screen. The nano touch screen may be a nano organic light emitting diode ("OLED") touch screen.

The touch screen may receive touch-based user input. As such, the nano LED touch screen may cover a portion of the frames and/or lenses of the smart glasses. Touch-based gestures may include swiping, tapping, squeezing and any other suitable touch-based gestures or combination of touch-based gestures.

In some embodiments, the smart glasses inputs may be hands-free. The smart glasses may receive hands-free input through voice commands, gesture recognition, eye tracking or any other suitable method. Gesture recognition may include air-based hand and/or body gestures. Air-based gestures may be performed without touching the smart glasses.

The smart glasses may include one or more sensors. Illustrative sensors may include a touch screen, camera, accelerometer, gyroscope and any other suitable sensors. The smart glasses sensors may detect hands-free input such as air gestures or eye movement.

The smart glasses may include one or more sensors for detecting and tracking eye position of a user. The sensor may be activated in response to sensor detection of a user eye. In some embodiments, the sensor may be activated by proximity of the smart glasses to an external computing device. In some embodiments, the sensor may be triggered by a user input such as a touch gesture, air gesture, or voice command. The sensors may be controlled by an eye tracking application executed on the smart glasses microprocessor. Eye position data detected by the sensors may be collected by the eye tracking application. Eye position data detected by the sensors may be stored in a memory embedded in the smart glasses.

Sensors for tracking user eye position may include cameras. In some embodiments, the cameras may be combined with illuminators. The illuminators may include a near infrared light source or any suitable light source.

One method of tracking user eye position involves pupil center corneal reflection (PCCR). PCCR is a method for remote, non-intrusive eye tracking. A light source illuminates the eye causing visible reflections and a camera captures an image of the reflections. A vector is calculated based on the angle between the cornea and pupil reflections. The direction of the vector combined with other geometrical features of the reflections may be used to determine eye position. Eye position may include gaze direction.

In some embodiments, the smart glasses may include multiple cameras per eye for increased accuracy in measuring gaze direction. The illuminators and/or cameras may be mounted on the glasses or integrated into the frame or lenses.

The smart glasses may include accelerometer, gyroscope and magnetometer sensors in order to provide differentiation between head and eye movements. The smart glasses may include slippage compensation and persistent calibration to enable consistent tracking when the glasses shift position on the user's head or when the glasses are removed and replaced within a predetermined time period.

The smart glasses may execute one or more applications for tracking eye position and storing eye position data. The smart glasses may use the NIC and the transceiver to transmit the eye position data. The smart glasses may transmit the eye position data to a computing device external to the smart glasses. The external computing device may be a mobile device, a desktop device, a laptop device or any suitable computing device.

The external computing device may include a display. The display may include a graphical user interface (GUI). The GUI be associated with a no-code development platform. A no-code development platform enables users to create application software by configuring units of programming logic on a GUI in place of traditional coding.

The no-code development platform may include graphical representations of programming functions. Each selectable programming function may correspond to a unit of programming logic. Each selectable programming function may be associated on the backend with a segment of programming code. A user may combine a series of programming functions by manipulating these representations and placing them in the desired sequence. The no-code development platform may assemble the segments of programming code associated with each of the selected functions to configure a new software application.

Eye position data gathered by smart glasses sensors may be calibrated with the GUI of a no-code development platform. Integrating the smart glasses with the development platform may enable a user to develop applications in a hands-free manner.

The system may include a camera associated with the external computing device display. The camera may determine the proximity of the smart glasses to the display.

In some embodiments, the smart glasses may continuously transmit eye position data while in proximity to the external display. In some embodiments, the smart glasses may transmit the eye position data at periodic intervals.

In some embodiments, the smart glasses may terminate or pause the transmission when the smart glasses are no longer within a predetermined proximity to the display. In some embodiments, the smart glasses may terminate or pause the transmission when the sensor fails to detect an eye position associated with visual focus on the display for a predetermined period of time.

The camera associated with the external computing device may determine position of the user head with respect to the display. The user head position may be periodically or continuously determined. Head position data may be synchronized with eye position data from the smart glasses sensor. User gaze direction combined with user head position may be extrapolated to determine a fixation point on the display and identify the corresponding screen coordinates.

The external computing device may include a smart glasses interface. The smart glasses interface may receive eye position data from the smart glasses.

The smart glasses interface may determine the relevance of the eye position data. The determination may be based on a level of visual focus. Eye position data may be associated with visual focus based on any suitable metric.

Metrics for tracking eye position may include a determination of gaze points. One gaze point may equal one raw sample captured by the eye tracker. Fixation may occur when a gaze point is maintained for a specific amount of time. Fixation may be associated with visual focus. Fixation may be associated with threshold level of visual focus.

In some embodiments, the system may capture saccades. Saccades may occur when the gaze is shifted from one point to another. Saccades are not associated with visual focus, but may establish the order and directions in which fixations occur. A fixation sequence may include a series of fixations in chronological order.

The smart glasses interface may filter the eye position data received from the smart glasses based on the relevance of the detected eye movements. For example, if the eye position data includes fixation without movement for a predetermined period of time, the system may determine that there is a legitimate focus on the user interface. On the other hand, if the eye position data shows rapid movements that do not meet a predetermined duration or positioning threshold, the system may remove these movements from the data set.

The external computing device may include a calibration engine. The smart glasses interface may transmit relevant eye tracking data to the calibration engine. The calibration engine may map an eye position determined at the smart glasses sensor to X and Y coordinates on the GUI. The mapping may be based on sensor data and user head position.

The calibration engine may map a user eye position to a selectable programming function on the GUI based on the sensor data and user head position. Based on the mapping, the calibration engine may determine that the user is focused on a selectable programming function displayed on the GUI.

The calibration engine may convert visual focus on a selectable programming function to executable actions. The visual focus may be converted to manipulations of selectable programming functions displayed on the external monitor.

Visual focus on the GUI coordinates may trigger selection of one of the selectable programming functions. In some embodiments, selection may occur by blinking. However, selection by blinking typically involves a risk of losing visual focus while the eye is closed. In some embodiments, selection may occur by focus on a specific area for a predetermined amount of time. The predetermined amount of time may be measured in fractions of a second.

In some embodiments, selection may be effected through a combination of visual focus with another input method. A user may focus on a selectable programming function and use touch methods, air gestures, or voice commands to select the identified option.

Visual focus may also enable a user to move a selected programming function, rearrange the order of selected programming functions, or delete a selection.

The smart glasses data may be calibrated for a particular no-code development program. Eye tracking data may be mapped to a specific arrangement of selectable programming functions on the GUI.

Illustrative programming functions may include loop functions, such as a while loop or do-while loop, print functions and go-to functions. In some embodiments, a series of displays may be used for groupings of programming functions. For example, programming functions may be grouped in modules based on type, typical usage, or any suitable categorization. A user may select from a variety of modules before selecting individual programming functions from a suite or a module. In some embodiments, a user may select program architecture configured to receive individual programming functions selected by the user. In some embodiments, a user may select templates that involve pre-arranged groups of programming functions.

The selectable programming functions, modules, architectures and templates may be displayed on the GUI as discrete graphical representations, text, drop down menus, and/or any suitable format.

The system may configure a software application based on the selected programming functions. Illustrative applications include mobile applications, games, simulation setup, and component-based robotic process automation. The system may assemble the units of programming code associated with each of the selected programming functions in the order of selection.

The system may enable the user to move a selected programming function based on eye position data from the smart glasses. The system may enable the user to rearrange the selected programming functions or delete a programming function based on eye position data from the smart glasses. In some embodiments eye position data may be supplemented with touch methods, air gestures or voice commands.

The calibration engine may include a training phase. During the training phase, the system may be trained to map eye position data to the selectable programming functions on the GUI. The system may be trained to correlate a sequence of eye movements with ordering of the programming functions. The system may be trained for a particular no-code development with a proprietary arrangement of selectable programming functions.

The system may develop a model including programming functions that are associated with GUI coordinates. The model may include scaling adjustments for displays of different sizes. The model may include adjustment factors for different user head heights and head distances with respect to the display.

In an exemplary embodiment, the smart glasses user may focus on a series of selectable programming functions displayed on a remote user interface. The smart glasses may detect eye position and eye movement. The calibration engine may map an eye position to a selectable programming function and invoke a class or library with standard actions. Using this library, the system may assemble a model. Feedback from the user or from the system may be applied to tune the calibration engine.

During a subsequent execution phase, the system may continue to optimize the calibration engine. The system may continuously monitor the outputs from the calibration engine and evaluate an output against the training models. In a case of a deviation, the system may overwrite the output based on the training models.

Optimization protocols may include using one or more machine learning algorithms. The system may include regression, classification, cluster analysis or any suitable machine learning algorithms.

In some embodiments, filtering the sensor data to determine relevance, visual focus, and sequence may occur within a smart glasses application executed by the smart glasses microprocessor. The smart glasses may use spatial and/or temporal criteria to determine visual focus. For example, random, quick eye movements may not be associated with visual focus. The smart glasses may filter out eye positions that are not associated a threshold level of visual focus.

In some embodiments, the GUI for the no-code development platform may be displayed directly on a smart glasses display using augmented reality technology. The smart glasses microprocessor may execute a calibration application that maps the eye position data detected by the sensor to selectable programming functions displayed on the lenses of the smart glasses.

In some embodiments, the smart glasses device may authenticate the user before activating the eye tracking sensors. The smart glasses may include an authentication application. User authentication may be based on one or more biometric factors, behavioral factors, touch or air gestures, or any suitable method or combination of methods. Illustrative biometric factors include fingerprint, voiceprint, and iris recognition. Illustrative behavioral features include gait, head movements, and body movements.

One or more non-transitory computer-readable media storing computer-executable instructions are provided. When executed by a processor on a computer system, the instructions perform a method for dynamic configuration of programming code via calibration of smart glasses data.

The method may include displaying, on a user interface, one or more selectable programming functions. Each programming function may be pre-associated with a segment of programming code implementing the function.

The method may include activating a smart glasses sensor. The sensor may capture a user eye position. The method may include activating a smart glasses eye tracking application. The eye tracking application may record a sequence of eye positions captured by the sensor.

The method may include mapping each user eye position to one of the programming functions displayed on the user interface. The method may include ordering the programming functions based, at least in part, on the sequence of user eye positions recorded by the eye tracking application. The method may include assembling the segments of programming code associated with each programming function based, at least in part, on the order of programming functions.

Incorporating smart glasses technology into no-code or low-code software development enables hands-free configuration of programming code. The smart glasses, with their fixed position on a user face, may capture a sequence of user eye positions more completely than other types of eye tracking hardware. Smart glasses are also highly portable and adaptable to a variety of computing environments. The customized models generated by the calibration engine integrate gaze point data captured by the smart glasses with the specific features of a no-code development platform running on the external device.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of determining visual focus, filtering eye-tracking data, calibrating eye tracking data to a graphical user interface display, establishing a model for accessing classes of functions, ordering programming functions, assembling programming code, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
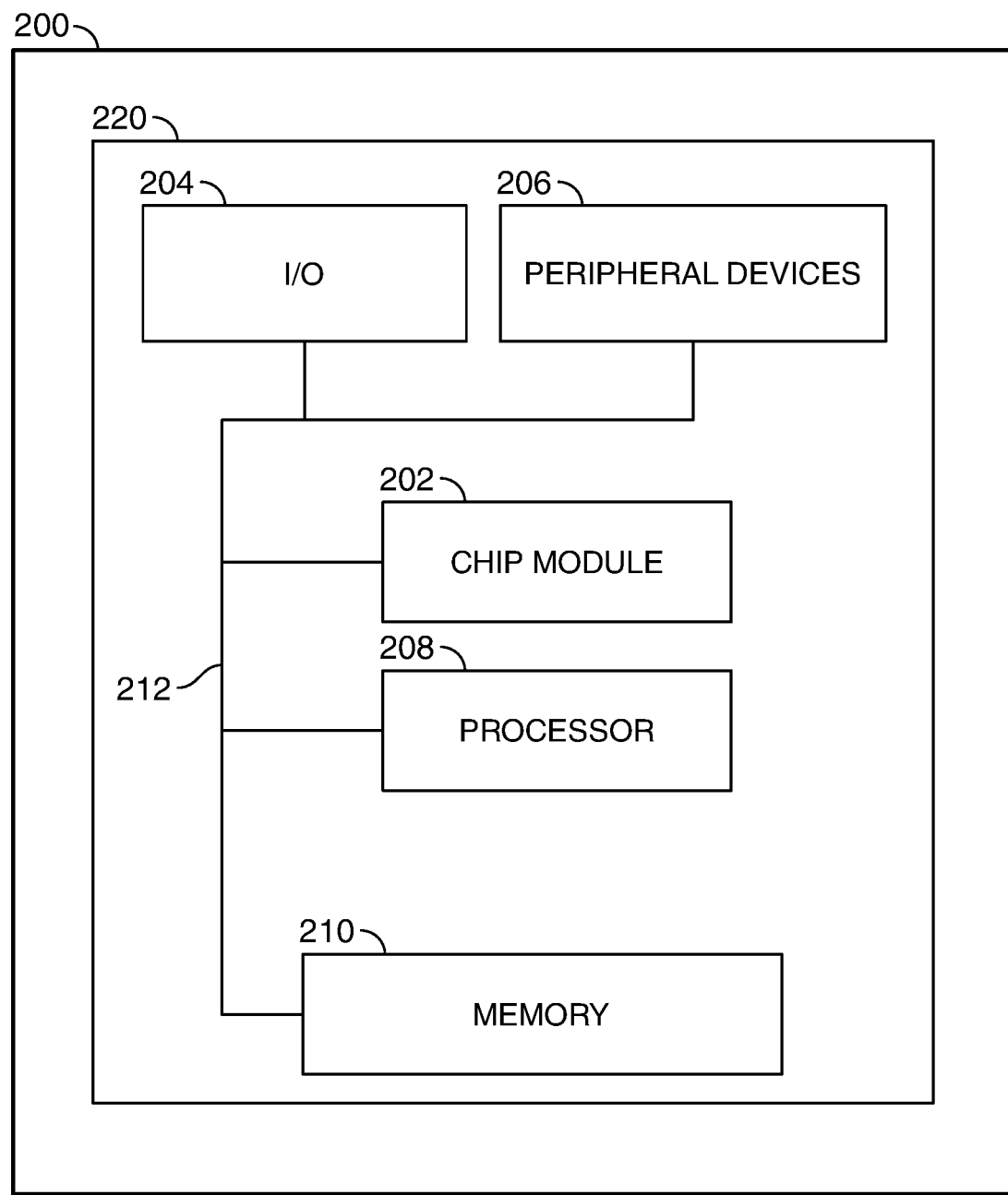
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may determine visual focus, calibrate eye tracking data, assemble programming code, and perform other methods described herein; and machine-readable memory 210.

Machine-readable memory 210 may be configured to store in machine-readable data structures: eye tracking data, programming functions, units of programming code associated with the programming functions and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
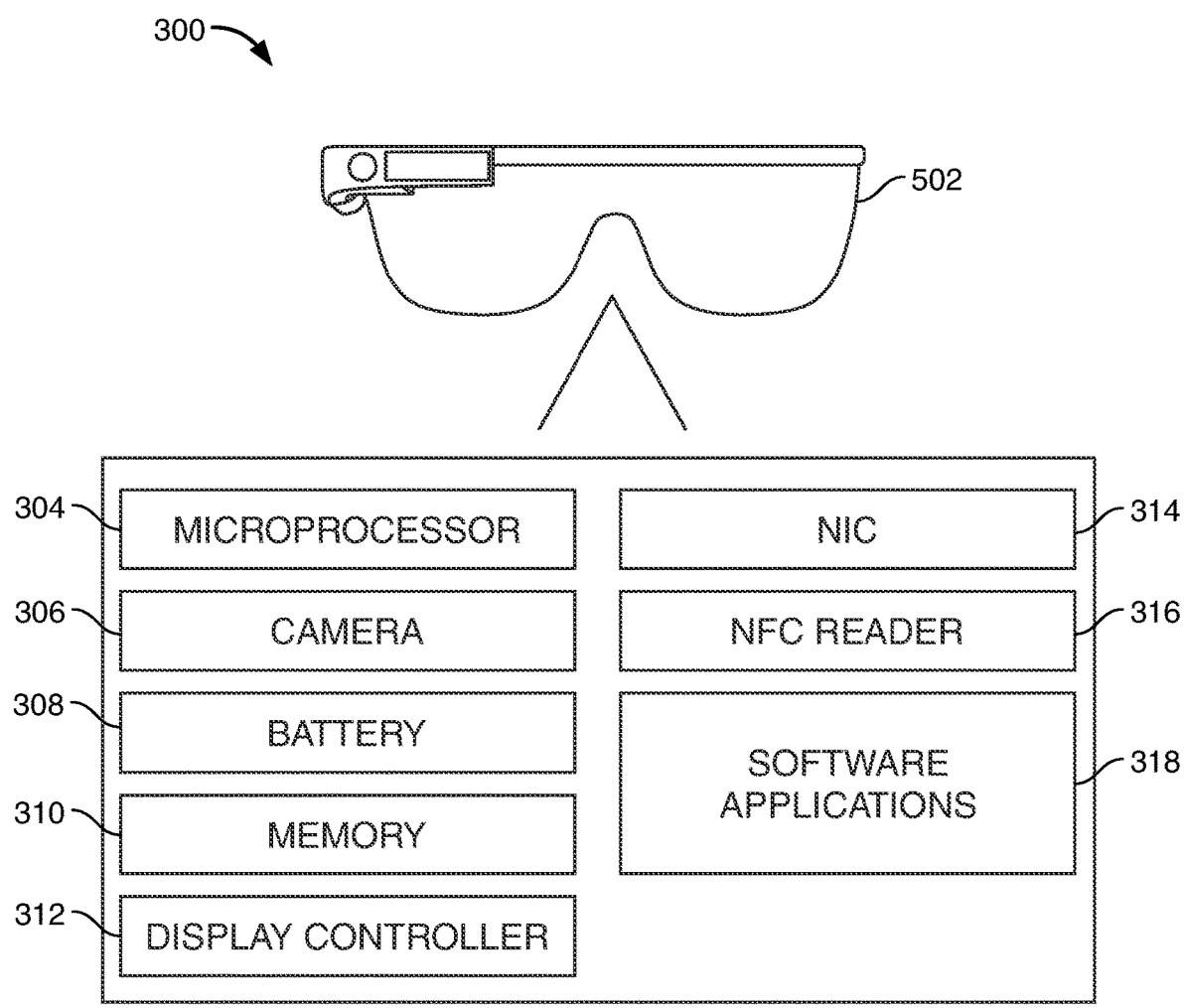
FIG. 3 shows illustrative apparatus in accordance with principles of the disclosure.

FIG. 3 shows illustrative architecture 300 for smart glasses 302. Smart glasses 302 may include microprocessor 304, camera 306, battery 308 and memory 310. Smart glasses 302 may include one or more sensors (not shown).

Smart glasses 302 may include display controller 312. In some embodiments the display may be an augmented reality display. Smart glasses 302 may include NIC 314 and NFC reader 316.

Figure 4A:
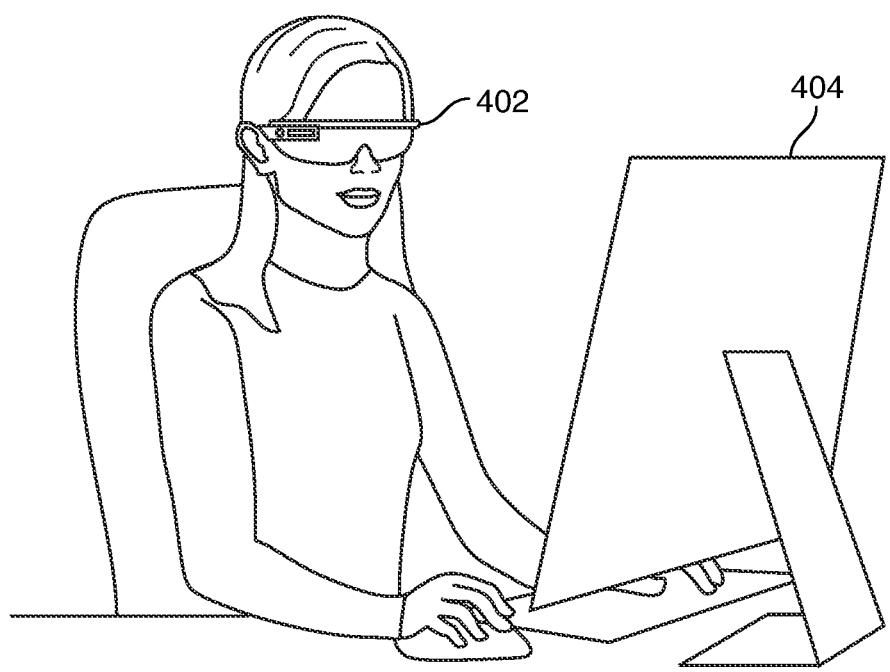
FIG. 4A shows an illustrative process in accordance with principles of the disclosure.

FIG. 4A shows illustrative process 400. A user wearing the smart glasses 402 may focus on remote display 404. The smart glasses may track user eye position and transmit the data to the remote computing device. The remote computing device may use the eye position data along with head position data to calibrate the eye position to coordinates on the display.

Figure 4B:
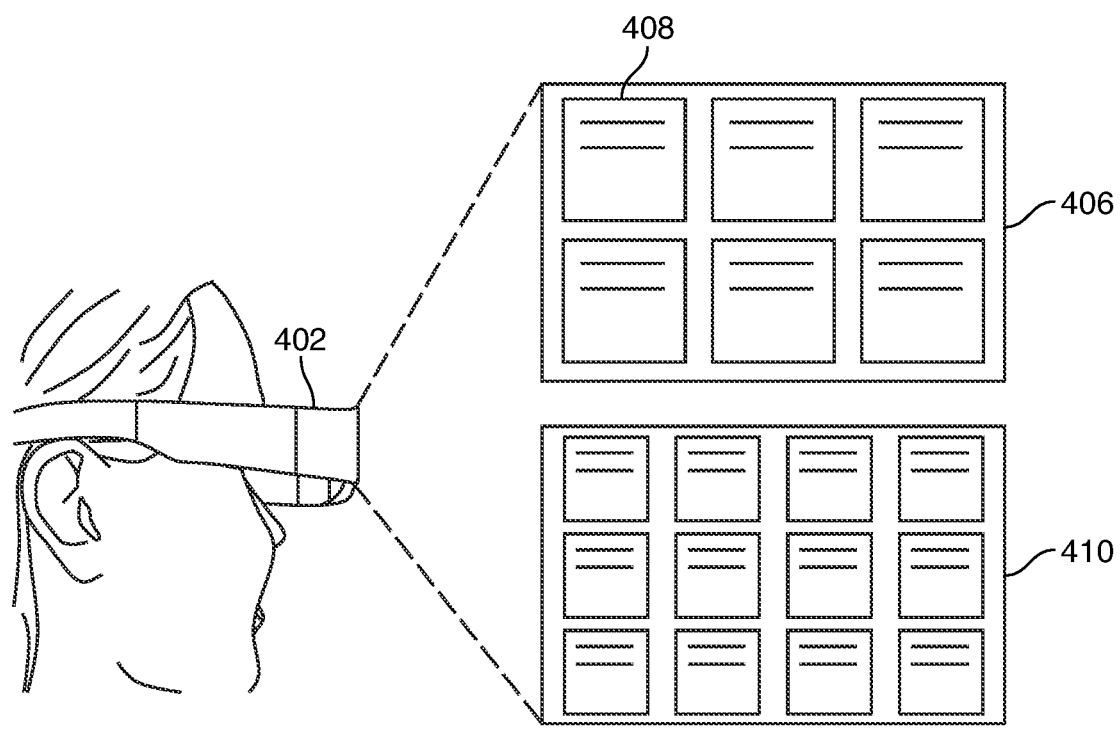
FIG. 4B shows an illustrative process in accordance with principles of the disclosure.

FIG. 4B shows additional details for illustrative process 400. As in FIG. 4A, the user wearing smart glasses 402 may focus on the remote display. Screen 406 may be shown on the display. The remote computing device may map an eye position detected by smart glasses 402 to image 408 on screen 406. Visual focus on image 408 may select the image and call up a new set of options as shown on screen 410. Visual focus may be applied to select an option or sequence of options from view 410.

Figure 5:
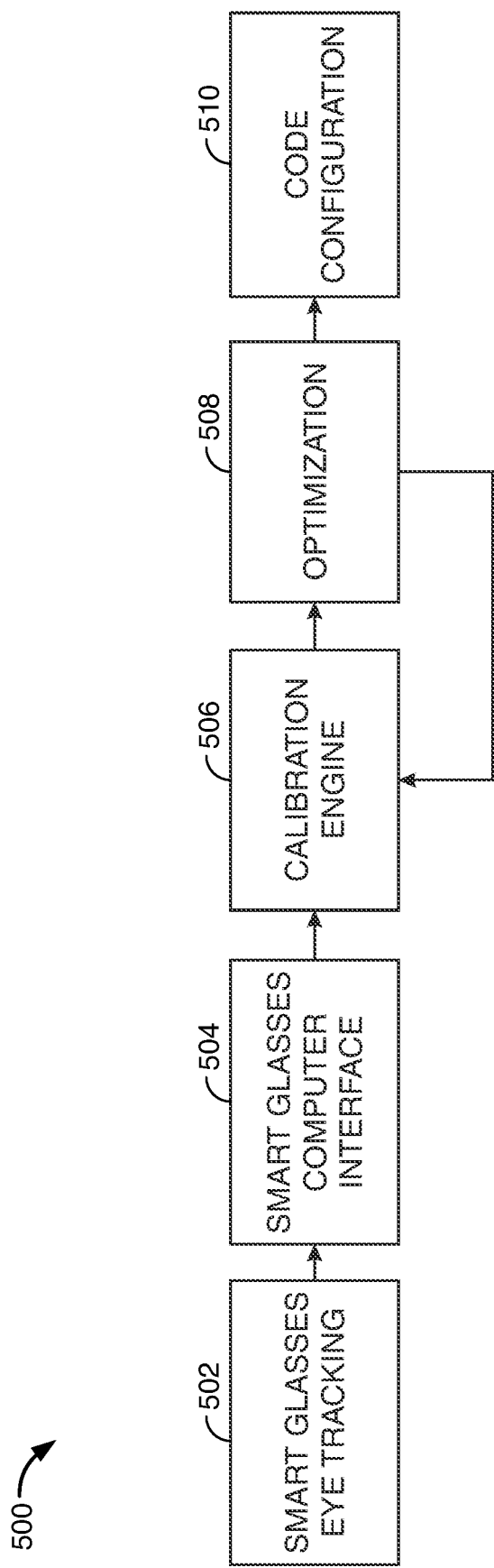
FIG. 5 shows an illustrative process flow in accordance with the principles of the disclosure.

FIG. 5 shows illustrative process flow 500 for assembly of programming code using visual focus. At step 502, smart glasses activate an eye tracking application to capture user eye position data using smart glasses sensors. At step 504, eye position data transmitted by the smart glasses is received at a smart glasses interface on an external computing device. The smart glasses interface may filter the eye position data based on the level of visual focus. At step 506, a calibration engine maps the eye position data to selectable programming functions on a graphical user interface. At step 508, the process is optimized to ensure that the mapping is consistent with a training model or with other models stored in a data repository. At step 510, programming code is assembled based on the selected programming functions.

Figure 6:
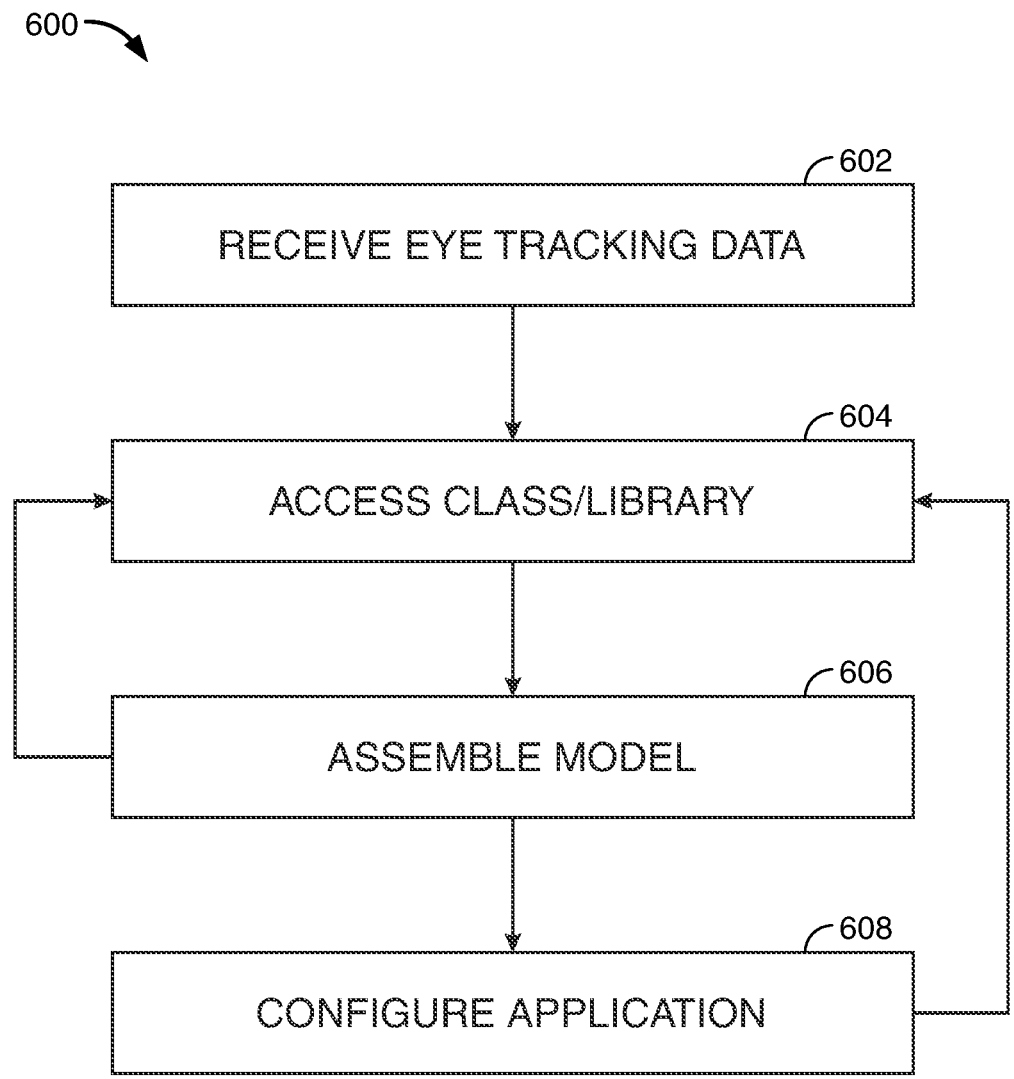
FIG. 6 shows an illustrative process flow in accordance with the principles of the disclosure.

FIG. 6 shows illustrative process flow 600 for training a calibration engine. Aspects of process flow 600 may be correspond to features shown in process flow 500. At step 602 eye tracking data is received from a smart glasses device. During the training phase, simulated eye tracking data may be used. At step 604, the calibration engine may access a class or library of functions to map the eye position data. At step 606, the calibration engine may assemble a model based on the mapping and the selectable programming functions determined by the mapping. At step 608, units of programming code may be assembled and an application may be configured based on the model. Feedback at step 606 and step 608 may be used to tune the steps taken by the calibration engine.

Thus, methods and apparatus for SMART GLASSES BASED CONFIGURATION OF PROGRAMMING CODE are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for dynamic configuration of programming code via smart glasses calibration, the system comprising:
   a smart glasses device comprising:
     a frame supporting one or more lenses;
     a microprocessor embedded in the frame;
     a wireless communication interface embedded in the frame;
     a battery for powering the communication interface and the microprocessor;
     a sensor configured to capture a user eye position; and
     executable instructions stored in a non-transitory memory, that when run by the microprocessor:
       capture a sequence of user eye positions using the sensor; and
       transmit the sequence of user eye positions using the wireless communication interface; and
   a computing device external to the smart glasses, the computing device comprising:
     a user interface configured to display one or more selectable programming functions, each programming function pre-associated with a segment of programming code implementing the function;
     a smart glasses interface configured to receive the sequence of user eye positions from the smart glasses; and
     a calibration engine configured to:
       map a user eye position to one of the programming functions displayed on the user interface;
       order the programming functions based, at least in part, on the sequence of user eye positions; and
       assemble the segments of programming code associated with each programming function based, at least in part, on the order of the programming functions.

2. The system of claim 1, wherein the smart glasses interface is configured to determine whether the smart glasses are within a predetermined distance from the display.

3. The system of claim 1, wherein the smart glasses interface is configured to determine, based on one or more spatial and/or temporal metrics, whether a user eye position captured by the smart glasses is associated with a predetermined level of visual focus.

4. The system of claim 3, wherein, when a user eye position captured by the smart glasses is not associated with the predetermined level of visual focus, the smart glasses interface is configured to remove the user eye position from the sequence of user eye positions.

5. The system of claim 3, wherein the calibration engine is configured to access a library comprising a class of actions based on the determination that the user eye position is associated with the predetermined level of visual focus.

6. The system of claim 1, wherein each of the selectable programming functions is associated with a discrete graphical representation.

7. The system of claim 1, wherein the calibration engine is configured to, based on the sequence of user eye positions:
   register an instruction to open a suite comprising a plurality of selectable graphical representations each associated with a programming function;
   register a selection of a template; and
   drag and drop a selectable graphical representation into the selected template.

8. The system of claim 1 further comprising an optimization engine configured to:
   determine whether a calibration engine output, the output mapping a user eye position to a selectable programming function, corresponds to a training model output; and
   when the calibration engine output does not correspond to the training model output, dynamically overwrite the calibration engine output.

9. One or more non-transitory computer-readable media storing computer-executable instructions which, when executed by a processor on a computer system, perform a method for dynamic configuration of programming code by calibrating smart glasses data, the method comprising:
   at a pair of smart glasses, the smart glasses comprising a frame and one or more lenses:
     capturing a sequence of user eye positions using a smart glasses sensor; and
     transmitting the sequence of user eye positions to an external computing device using a smart glasses wireless interface; and
   at the external computing device:
     displaying one or more selectable programming functions on a user interface, each programming function pre-associated with a segment of programming code implementing the function;
     receiving the sequence of user eye positions from the smart glasses;
     mapping each eye position to a programming function displayed on the user interface;
     ordering the programming functions based, at least in part, on the sequence of user eye positions; and
     assembling segments of programming code associated with each programming function based, at least in part, on the order of programming functions.

10. The media of claim 9, further comprising determining whether the smart glasses are within a predetermined distance from the display.

11. The media of claim 9, further comprising determining, based on one or more spatial and/or temporal metrics, whether an eye position received from the smart glasses is associated with a predetermined level of visual focus.

12. The media of claim 11, further comprising removing an eye position that is not associated with the predetermined level of visual focus from the sequence of user eye positions.

13. The media of claim 9, wherein each of the selectable programming functions is associated with a discrete graphical representation.

14. The media of claim 9, further comprising, based on a sequence of eye positions:

registering an instruction to open a suite comprising a plurality of selectable graphical representations each associated with a programming function;

registering a selection of a template; and dragging and dropping a selectable graphical representation into the selected template.

15. The media of claim 9 further comprising:

determining whether a calibration engine output, the output mapping a user eye position to a programming function, corresponds to a training model output; and when the calibration engine output does not correspond to the training model output, dynamically overwriting the calibration engine output.

16. A method for dynamic configuration of programming code via calibration of smart glasses data, the method comprising:

displaying, on a user interface, one or more selectable programming functions, each programming function pre-associated with a segment of programming code implementing the function;

activating a smart glasses sensor, the sensor configured to capture a user eye position;

activating a smart glasses eye tracking application, the eye tracking application configured to record a sequence of eye positions captured by the sensor;

mapping each user eye position to one of the programming functions displayed on the user interface;

ordering the programming functions based, at least in part, on the sequence of user eye positions recorded by the eye tracking application; and assembling the segments of programming code associated with each programming function based, at least in part, on the order of programming functions.

17. The method of claim 16, wherein the smart glasses comprise:

a frame supporting one or more lenses;

a microprocessor embedded in the frame;

a wireless communication interface embedded in the frame;

a battery for powering the communication interface and the microprocessor; and executable instructions stored in a non-transitory memory, that when run by the microprocessor activate the smart glasses sensor and the smart glasses eye tracking application.

18. The method of claim 16, further comprising determining, based on one or more spatial and/or temporal metrics, whether a user eye position captured by the smart glasses is associated with a threshold level of visual focus.

19. The method of claim 18, further comprising filtering out an eye position that is not associated with the threshold level of visual focus.

20. The method of claim 16, wherein each of the selectable programming functions is associated with a discrete graphical representation.

21. The method of claim 16, further comprising, based on a sequence of eye positions:

registering an instruction to open a suite comprising a plurality of selectable graphical representations each associated with a programming function;

registering a selection of a template; and dragging and dropping a selectable graphical representation into the selected template.

* * * * *